United States Patent
Khouri et al.

(10) Patent No.: US 8,000,456 B2
(45) Date of Patent: Aug. 16, 2011

(54) TECHNIQUES FOR MARKING AND MANIPULATING VOICE MESSAGE SEGMENTS THROUGH A TELEPHONE USER INTERFACE

(75) Inventors: Joseph Khouri, San Jose, CA (US); Labhesh Patel, San Francisco, CA (US); Mukul Jain, San Jose, CA (US); Sanjeev Kumar, San Francisco, CA (US); Shmuel Shaffer, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1043 days.

(21) Appl. No.: 11/408,697

(22) Filed: Apr. 20, 2006

(65) Prior Publication Data

US 2007/0263793 A1 Nov. 15, 2007

(51) Int. Cl.
*H04M 1/64* (2006.01)
(52) U.S. Cl. ...................... 379/88.26; 379/76
(58) Field of Classification Search ............ 379/88.26, 379/67.1, 88.22–88.23, 88.27, 76; 704/235
See application file for complete search history.

(56) References Cited

U.S. PATENT DOCUMENTS

| | | | | |
|---|---|---|---|---|
| 4,891,835 A * | 1/1990 | Leung et al. | ............... | 379/88.11 |
| 5,577,041 A * | 11/1996 | Sharma et al. | ............... | 370/271 |
| 5,943,402 A * | 8/1999 | Hamel et al. | ............... | 379/88.26 |
| 6,006,351 A * | 12/1999 | Peretz et al. | ............... | 714/751 |
| 6,219,638 B1 * | 4/2001 | Padmanabhan et al. | ...... | 704/235 |
| 6,526,128 B1 | 2/2003 | Kermani | | |
| 6,691,151 B1 | 2/2004 | Cheyer et al. | | |
| 7,424,098 B2 * | 9/2008 | Kovales et al. | ............... | 379/76 |
| 2004/0252679 A1 | 12/2004 | Williams et al. | | |

* cited by examiner

*Primary Examiner* — Fan Tsang
*Assistant Examiner* — Mohammad Islam
(74) *Attorney, Agent, or Firm* — Fish & Richardson P.C.

(57) ABSTRACT

In one embodiment, techniques for manipulating a voice message using a telephone user interface are provided. The telephone user interface receives a mark begin segment command from a telephonic device through a voice modality. The mark begin segment command indicates a beginning point for a voice message segment in the voice message. The telephone user interface then receives a mark end segment command from the telephonic device through the voice modality. The mark segment command indicates an ending point for the voice message segment in the voice message. An action command from the telephonic device is received and an action based on the action command for the voice message segment is performed. The voice message segment is a portion of the voice message determined based on the indicated beginning point of the voice message segment and the indicated ending point of the voice message segment in the voice message.

38 Claims, 4 Drawing Sheets

TECHNIQUES FOR MARKING AND MANIPULATING VOICE MESSAGE SEGMENTS THROUGH A TELEPHONE USER INTERFACE

BACKGROUND OF THE INVENTION

Embodiments of the present invention generally relate to telecommunications and more specifically to techniques for marking and manipulating voice message segments in a voice message.

In voicemail/unified messaging systems, a user (e.g., a recipient or sender) of a voice message can perform actions through a telephone user interface (TUI). For example, commands may be sent via the TUI, such as saving a message, deleting a message, forwarding/sending a message, etc. These actions, however, operate on the entire message.

Performing actions on the entire message includes some disadvantages. For example, a first user may not want to forward the entire message to a second user. There may be sensitive and/or confidential information in the message that the second user should not hear. The first user, however, does not have any choice but to send the entire message. Thus, the first user may have to separately call the second user and rehash the message leaving out the confidential information. It may not be efficient for the first user to call the second user. Also, the first user may not perfectly rehash the message (without the sensitive or confidential part), which may cause a misunderstanding of the message or may leave out an important part of the message.

DETAILED DESCRIPTION OF EMBODIMENTS OF THE INVENTION

Figure 1:
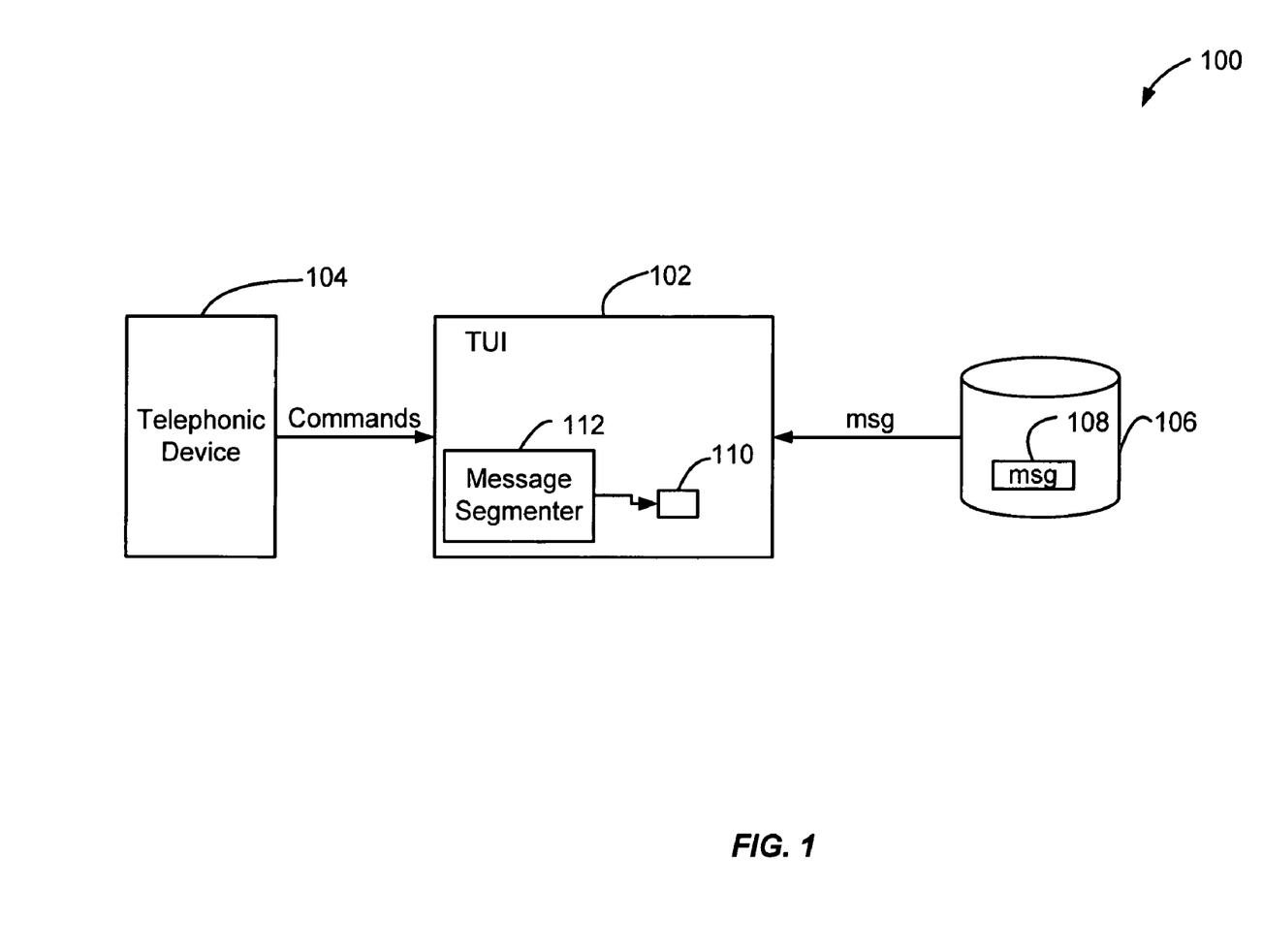
FIG. 1 depicts a system for marking and manipulating voice message segments according to one embodiment of the present invention.

FIG. 1 depicts a system 100 for marking and manipulating voice message segments according to one embodiment of the present invention. As shown, a telephone user interface 102, a telephonic device 104, and storage 106 are provided. It will be understood that any number of components depicted in system 100 may be provided, and variations of system 100 will be appreciated. For example, multiple telephonic devices 104 may communicate with one or more telephonic user interfaces 102. Also, in one embodiment, telephone user interface 102 may be part of a unified messaging system, which will be described in more detail below. It will be recognized, however, that telephone interface 102 may be used in any environment, such as a voicemail system, and is not restricted to being used in a unified messaging system.

Telephone user interface 102 provides an interface to a user using a telephonic device 104. This interface can include the standard "12 button" numeric keypad along with additional buttons or other controls that are found on telephone handsets, cellular phones, etc. Future telephone user interfaces may evolve to include different types of controls that can be adapted for use with embodiments of the invention. Inputs other than controls such as motion or gesture detection, speech recognition, etc. can also be used in telephone user interface 102. Telephone user interface 102 may be used by a user to listen to voice messages. For example, a user may listen to voice messages in addition to voice translations (text to speech) of text based messages, such as e-mails, instant messages, etc. As will be described below, a user may interact with telephone user interface 102 by sending commands to it.

Telephone user interface 102 may be used by a user that is leaving a message (a sender of a message) or a user that is checking a message (a recipient of a message). Although telephone user interface 102 is shown as being separate from telephonic device 104, it will be understood that functions of telephone user interface 102 may be distributed between telephonic device 104 and telephone user interface 102.

Storage 106 is configured to store the voice messages. Storage 106 may be an e-mail server, voicemail database, or any other storage device. Although one storage device is shown, it will be understood that messages may be stored in multiple storage devices. For example, email messages may be stored in an email server, voice messages in a voicemail server, etc.

Telephonic device 104 may be any telephonic device for transferring voice information. For example, telephonic device 104 may be a cellular phone, plain old telephone service (POTS) telephone, a voice client on a computer (e.g., a voice-enabled IM client, an Internet-enabled voice over internet protocol (VOIP) device), etc. Telephonic device 104 is configured to communication in a voice modality. A modality refers to a "mode" of communication. "Voice modality" refers to any mechanism for transferring voice information and may include systems such as POTS, cellular, VOIP, etc.

Telephonic device 104 is configured to interact with telephone user interface 102 using voice modality commands, such as dual-tone multi-frequency (DTMF) commands or voice commands. DTMF commands may also be known as touch-tone or tone dialing and are used for telephone signaling over a line in a voice frequency band. Voice commands may be any audible commands that can be sent through the voice modality. The voice modality commands may be spoken by a human user or generated by an application, such as a text-to-speech application.

As shown, message 108 is stored in storage 106. Although one message is described, it will be understood that any number of messages may be stored in storage 106. Message 108 may be any voice message. For example, message 108 may be a voicemail message that has been recorded by a user. A voice message may include any format that can be transformed into an audible version of a message. For example, message 108 may be an email message that has been or will be translated into a voice representation using a text-to-speech converter.

In one embodiment, telephonic device 104 couples to telephone user interface 102. For example, a user may wish to check their voicemails or emails. The connection may be made using known processes, such as by dialing a voicemail number.

Telephonic device 104 may then be used to request a voice message 108 using telephone user interface 102. Telephone user interface 102 provides message 108 to telephonic device 104. For example, a user can listen to message 108.

Embodiments of the present invention allow a user to use telephonic device 104 to mark segments of message 108 to form a message segment 110. A message segmenter 112 is configured to receive voice modality commands from telephone 106 and indicate where a message segment 110 should be formed in message 108. The voice modality commands are received while message 108 is being rendered to telephonic device 104. The voice modality commands received may include DTMF commands, voice (i.e., audible) commands, or any other commands that can be received through a voice modality. Message segmenter 112 creates message segment 110 based on the commands received. Actions can then be performed on message segment 110.

In one embodiment, voice modality commands are used instead of using commands in a graphical user interface. Voice modality commands include any commands recognized by telephone user interface 102, such as DTMF or voice prompts. Voice modality commands typically do not use a text display or other detailed display output. This means that a user using a voice modality telephone interface is not able to perform visual editing operations such as highlighting, copying, cutting, pasting, or otherwise editing a portion of a message as can be done using a graphical user interface. For example, in one embodiment of the invention, the user relies heavily or exclusively on voice modality commands and does not use graphical user interface operations. Speech recognition or natural speech recognition may be used to recognize voice commands for marking voice segments.

Figure 2:
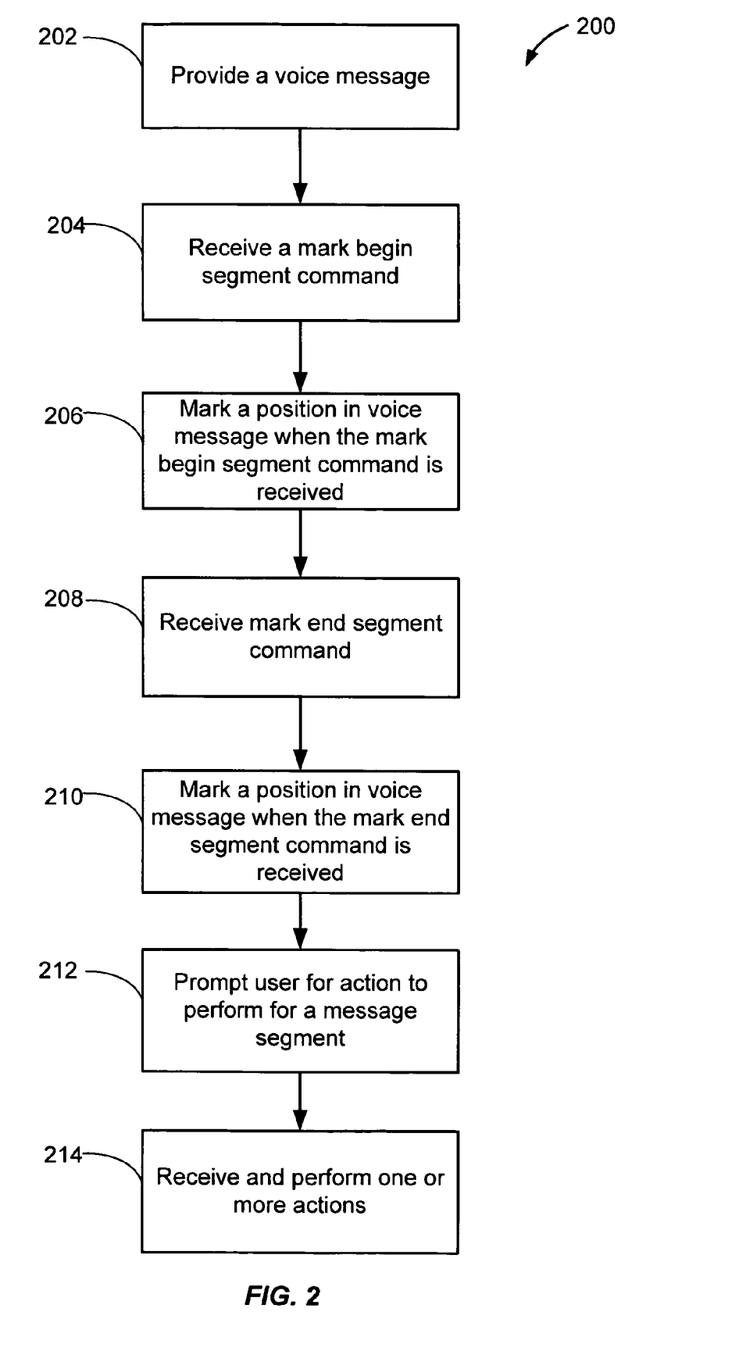
FIG. 2 depicts a simplified flowchart of a method for marking voice message segments according to one embodiment of the present invention.

FIG. 2 depicts a simplified flowchart 200 of a method for marking voice message segments according to one embodiment of the present invention. In step 202, telephone user interface 102 provides voice message 108. Voice message 108 may be provided over any network, such as a public switch telephone network (PSTN), a cellular network, the Internet, a voice-over IP network (VOIP), an instant messaging network, etc.

In step 204, telephone user interface 102 receives a mark begin segment command from telephonic device 104 while message 108 is being rendered. The mark begin segment command indicates the beginning point of a message segment in voice message 108.

The mark begin segment command may be sent using voice modality commands, such as DTMF and/or voice commands. For example, while the user is listening to voice message 108, the user can sequentially press the two keys "62" on telephonic device 102, which produces DTMF tones for "62". In one embodiment, the numbers "62" are chosen because they indicate the letters "M" and "B", which can stand for "mark begin". Additionally, a user may use a voice modality command, such as the user may say "mark begin", "62", "MB", etc. to begin the marking of a segment. It will be understood that other commands may be used to indicate the beginning of a segment 110. For example, different key combinations can be used, keys can be pressed simultaneously or operated in conjunction with other controls, a voice command can be used, etc. Also, in one embodiment, the user can specify the first word that the segment should start with.

In step 206, telephone user interface 102 marks a position in voice message 108 when the mark begin segment command is received. For example, when the mark begin segment command is received, telephone user interface 102 may insert an index into message 108 to mark the beginning of a message segment 110. Although an index is described as being inserted, it will be recognized that any methods for marking where in the message 108 that the mark begin segment command is received will be appreciated. For example, a time elapsed for the message may be stored wherein the message segment is formed substantially between the first time and the second time.

In step 208, telephone user interface 102 receives a mark end segment command from telephonic device 104. As described above, DTMF or voice commands may be received. In one embodiment, for the mark end segment command, DTMF tones for the numbers "63" may be received. In this case, "63" corresponds to "M" and "E" on a touch-tone pad, which stands for "mark end". Also, a user may send a voice modality command, such as "mark end", "63", "ME", etc., to end the marking of segment 110.

In step 210, when the mark end segment command is received, telephone user interface 102 marks an end point of message segment 110 for message 108. For example, telephone user interface 102 may insert an index into message 108 to mark the end of message segment 110. Although an index is described as being inserted, it will be recognized that any methods for marking where in message 108 that the mark end segment command is received will be appreciated. For example, a second time for message 108 may be stored.

In step 212, telephone user interface 102 prompts a user for an action to be performed for message segment 110. For example, telephone user interface 102 may provide the user a menu of possible actions that can be taken. Telephone user interface 102 may state "if you wish to save the message segment, press 1, say 1, or say save; to replay the message segment, press 2, say 2, or say replay; to send/forward the message segment, press 3, say 3, or say forward; to take no action, press 9, say 9, or say no action." It will be understood that other actions may be appreciated.

In step 214, telephone user interface 102 receives one or more actions to perform and subsequently performs the action. For example, if the action is save, then message segment 110 is stored in storage 106 (or any other storage area). Further, message segment 110 may be forwarded to a specified user, etc.

In addition to taking actions on message segment 110, actions can be taken on voice message 108 with message segment 110 cut/deleted from it. For example, message segment 110 from voice message 108 is deleted to create a second voice message. Then, actions on the second message may be taken. For example, the second message may be forwarded to another user, saved, etc. This is useful if a user wants to remove undesirable portions of a message. For example, a user may remove or mark a confidential portion of the message and delete/cut it out before forwarding the rest of the message to others. In one embodiment, the segment 110 is marked as edited version of the original message 108. The recipient of the segment 110 is then notified that the recipient heard only portion of the original message.

Figure 3:
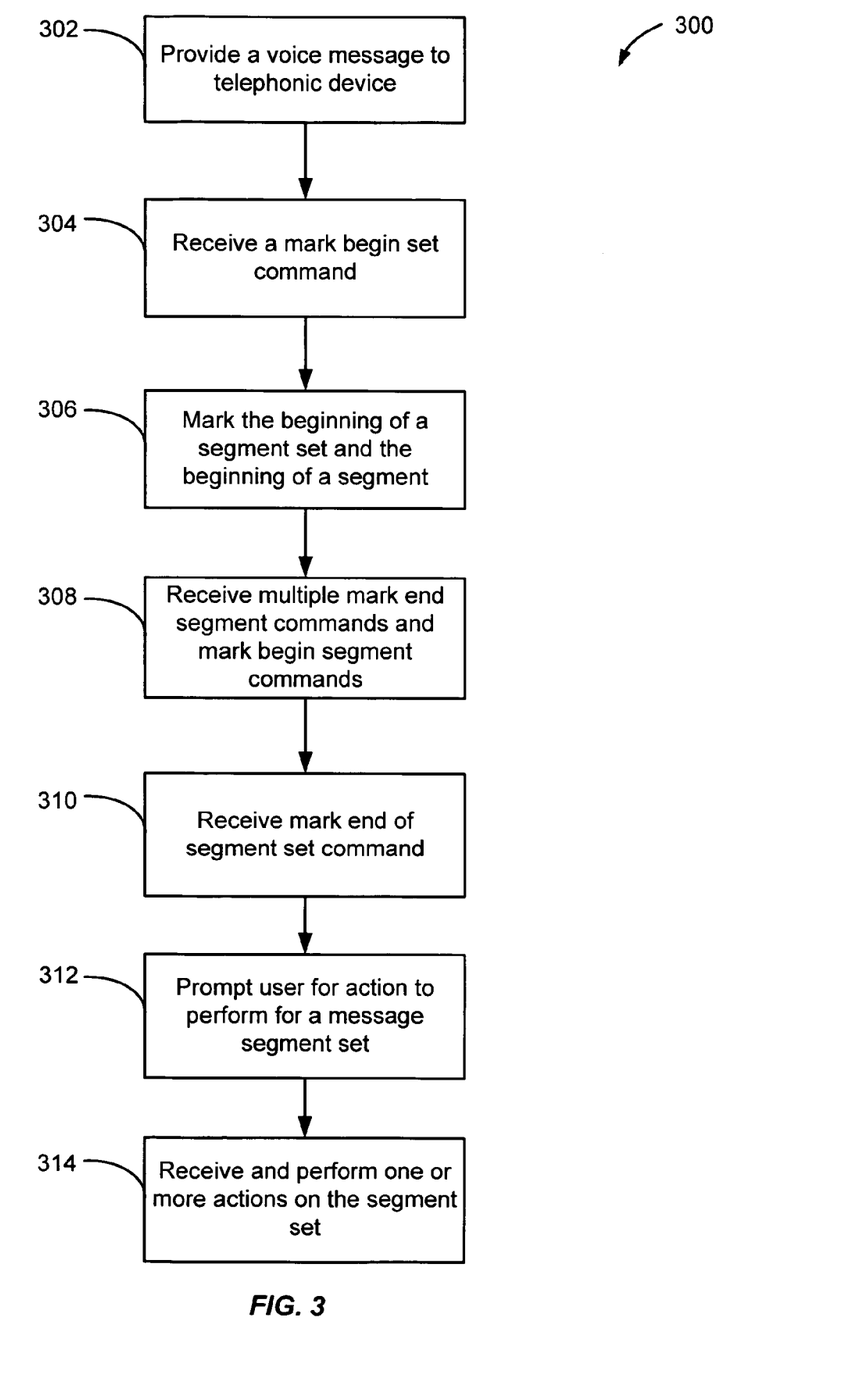
FIG. 3 depicts a simplified flow chart of a method for marking multiple message segments according to one embodiment of the present invention.

In another embodiment, a set of message segments may be marked instead of a single message segment. Actions then can be performed on the set of message segments (either on the set as a whole or on separate message segments individually). FIG. 3 depicts a simplified flow chart 300 of a method for marking multiple message segments according to one embodiment of the present invention. In step 302, telephone user interface 102 renders a voice message 108 to telephonic device 104.

In step 304, telephone user interface 102 receives a mark begin set command from telephonic device 104. In one embodiment, while a user is listening to voice message 108, the user can press touch-tone keys "627", which sends DTMF tones for "627". This may correspond to the letters "MBS" on a touch-tone pad. Further, the user may say the numbers "627", or "MBS" (for mark beginning of the segment set), "mark begin set", etc. to start marking a segment set.

In step 306, telephone user interface 102 marks the beginning of a segment set and also may mark the beginning of a first message segment 110. Thus, telephone user interface 102 expects multiple segments to be indicated by telephonic device 104.

In step 308, multiple mark end segment commands and mark beginning segment commands that signify message segments 110 are received. This process may proceed as described above in steps 304-310 of FIG. 2. For example, a mark end segment may be received to form a first segment. Then, the user may listen to message 108 for a time period. Then, a mark begin segment may be received to start a second segment. When the mark end segment is received, a second segment is formed. This process may continue as a user defines multiple message segments.

In step 310, a mark end of segment set command is received. This may be done by a user pressing the touch-tone keys "637", which product DTMF tones for "637", by saying "637", or by saying "MES" (for mark end of the segment set), etc. This marks the end of the segment set and may also mark the last segment of the set.

In step 312, telephone user interface 102 prompts the user for an action to perform. The actions that are prompted may be the same as described above, such as the segment set can be saved, deleted, forwarded, etc. Further, other actions may be provided for the segment set. For example, an option may be provided for a user to join the segments marked in the set into a single message segment 110. The action can then be performed on the single message segment. Also, the user may indicate different actions for individual message segments in the set. For example, a user may indicate that a first message segment is sent to a first user, a second message segment is sent to a second user, and a third message segment is saved, etc.

In step 314, one or more actions are received and performed for the segment set.

In one embodiment, the user may also delete/cut message segments 110 in the segment set from the message and take actions on a second message that is created, as described above.

Embodiments of the present invention provide many advantages. For example, telephone user interface 102 provides a voice interface in which a voice message may be marked to create a message segment using DTMF and/or voice commands. Thus, commands for a voice message are provided with extra functionality and flexibility through telephone user interface 102 because these commands can be performed on message segments. This provides a more powerful interface for manipulating voice messages.

Also, undesirable/sensitive portions may be cut out of a message prior to sending/forwarding to others. Further, important parts of a message may be cut out and saved for later use or forwarded to another user. This removes redundant actions that may have been previously required, such as having to call a user and repeat a message without a sensitive portion when the message could have just been forwarded without the message segment. In one embodiment, the segment 110 is marked as edited version of the original message 108. The recipient of the segment 110 is then notified that the recipient heard only portion of the original message.

Embodiments of the invention implement may use a unified messaging system. Such an approach may be useful where a central company provides multiple communication services to an end user. In general, however, the functionality described herein can be performed in one or more devices at the same or different locations at various times. A more distributed approach may allow multiple different companies or entities to participate in providing services and charging for the services.

Figure 4:
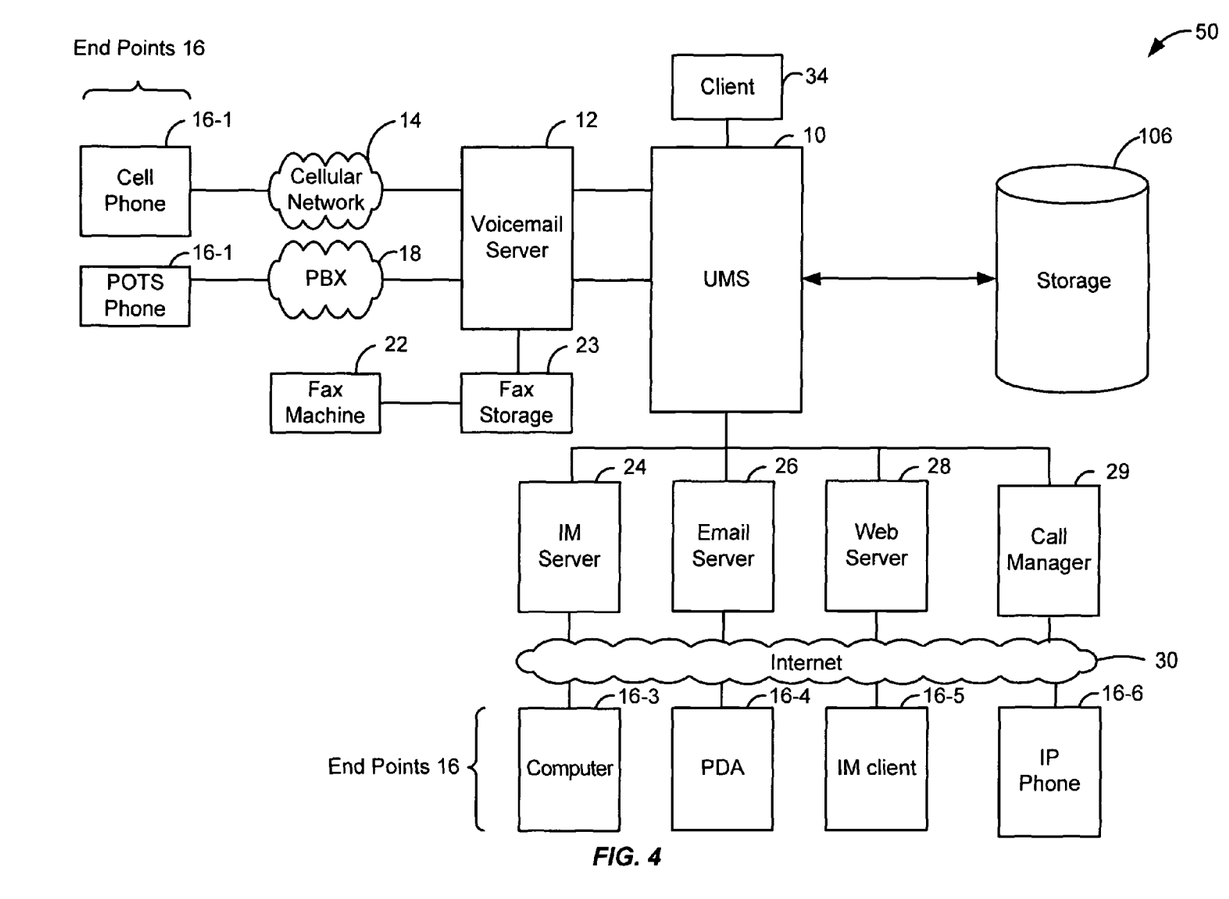
FIG. 4 depicts a unified messaging system that may include a telephone user interface according to one embodiment of the present invention.

FIG. 4 depicts a unified messaging environment 50 that may include telephone user interface 102 according to one embodiment of the present invention. In one embodiment, unified messaging system 10 provides a single access point for messages for a user regardless of the message type and the message origination (e.g., communication modality). For example, unified messaging system 10 may deliver emails, voicemails, instant messages, short message service (SMS) messages, and facsimile messages to a single inbox, such as a user's email box. Thus, the user can check all messages from a single point. Using unified messaging, the user can listen to his/her email over the telephone, check voice messages through their email inbox, view a fax through his/her email inbox, etc.

Various communication modalities are shown in environment 50. A modality refers to a "mode" of communication. A modality can be distinguished by data format, type of signal, physical link or infrastructure, or other characteristic of a communication. For example, email, telephone, VOIP, instant messaging, chat, web posting, web page displaying, faxing, paging, etc., can each be considered a "modality." Also, a modality may be broken up into sub-modalities, such as instant messaging may be broken up into AOL AIM™, MSN Messenger™, and Yahoo! IM modalities.

The various communication modalities may store messages on various storage media. Also, it may be a history of communications, such as a call history from a cellular phone. In some cases, text-to-speech and speech-to-text converters may be used. For example, an email message may be converted into voice using a speech-to-text converter. Also, the email message may be stored and then the conversion is performed in real-time when the voice representation of the email message is needed.

Various end points 16 in environment 50 may be used to send messages to a user. End points 16 may include any devices that can communicate in a modality, such as a cell phone 16-1, a POTS phone 16-2, a computer 16-3, a personal digital assistant 16-4, an IM client 16-5, a router, etc.

As shown, a cell phone 16-1 may be used to leave or send voice messages through a cellular network 14. The voice messages may be managed by voicemail server 12.

Also, a POTS phone 16-2 may be used to leave or send voice messages through a PBX system 18. Another modality may be a facsimile modality. As shown, a FAX machine 22 may send a FAX to the user stored in FAX storage 23.

Other communication modalities may use the Internet to communicate. Although the Internet is described, any packet-based network may be used, such as any local area network, wide area network, wireless network, etc. Email, voicemail, web pages, instant messages, etc. may be sent through an Internet 30. As shown, instant messages may be stored on an IM server 24, emails may be stored on an email server 26, and web pages may be stored on a web server 28. End devices of a computer 16-3, PDA 16-4, IM client 16-5, or any other end device may be used to send messages to the user or used by the user to send messages to contacts. IP phone 16-6 is used to make voice over IP (VOIP) calls. A call manager 29 is used to manage the calls and any messages (e.g., voice messages) for the IP phone modality.

Although the above modalities are described, it will be understood that other communication modalities may be appreciated by persons skilled in the art. For example, unified messaging system 10 may access messages from enterprise modalities. An enterprise modality may be any modality controlled by an enterprise (e.g., a business or company). Examples include an enterprise's email, voicemail, etc. Although enterprise modalities are described, it will be understood that unified messaging system 10 may access non-enterprise messages. For example, methods described below allow non-enterprise messages to be accessed.

Unified messaging system 10 is configured to aggregate messages from various media into storage 106. Although it is described that messages are stored in storage 106, it will be recognized that messages do not have to be physically stored in a single storage device. For example, voice messages may be stored on an email server; email messages, instant messages, etc. may be stored on a voicemail server; etc. Thus, messages may be stored in multiple storage areas (i.e., distributed). However, for discussion purposes, messages from various modalities will be discussed as being stored in storage 106. However, messages stored on IM server 24, email server 26, voicemail server 12, fax storage 23, and web server 28 may be logically aggregated by unified messaging system 10, but will be described as being stored in storage 106.

A client 34 may be used to view the communication records aggregated by unified messaging system 10. For example, a personal computer may be used to view email messages, voice messages, and faxes in an email inbox.

Although the invention has been described with respect to specific embodiments thereof, these embodiments are merely illustrative, and not restrictive of the invention.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain and store the program for use by or in connection with the instruction execution system, apparatus, system, or device. The computer-readable medium can be, by way of example only but not by limitation, a semiconductor system, apparatus, system, device, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

We claim:

1. A method for manipulating a voice message using a telephone user interface (TUI), the method comprising:
    rendering, using the TUI, a voice message to a telephonic device;
    receiving a mark begin segment command representing input from a first physical control at the telephonic device via the TUI, the mark begin segment command indicating a beginning point for a voice message segment in the voice message;
    storing a first time value corresponding to the beginning point based on receiving the mark begin segment command, wherein the first time value is stored separately from the voice message;
    receiving a mark end segment command representing input from a second physical control that differs from the first physical control at the telephonic device through the voice modality via the TUI, the mark end segment command indicating an ending point for the voice message segment in the voice message;
    storing a second time value corresponding to the ending point of the voice message segment based on receiving the mark end segment command, wherein the second time value is stored separately from the voice message;
    determining the voice message segment based on receiving the mark begin segment command and the mark end segment command, the voice message segment being a section of the voice message, the voice message segment having a duration being defined by the beginning point indicated by the first time value and the ending point indicated by the second time value, the first time value and the second time value being determined based on receiving respectively the mark begin segment command and the mark end segment command, wherein the mark begin segment command is a type of command that is different from a type of command of the mark end segment command;
    receiving, in response to a prompt at the telephonic device for a selection of an action from a menu of possible actions, an action command from the telephonic device via the TUI; and
    performing, by a computer processor, an action on the voice message segment based on the action command received from the telephonic device.

2. The method of claim 1, wherein the mark begin segment command comprises at least one of a dual-tone multi-frequency (DTMF) command and a voice command, and the mark end segment command comprises at least one of a DTMF command and a voice command.

3. The method of claim 1, wherein the action comprises at least one of saving the voice message segment, replaying the voice message segment, forwarding the voice message segment, deleting the voice message segment from the voice message, and sending the voice message segment.

4. The method of claim 1, further comprising receiving the mark begin segment command and the mark end segment command while the voice message is being rendered by the telephone user interface.

5. The method of claim 1, wherein the mark begin segment command comprises a first spoken word and the mark end segment command comprises a second spoken word, the method further comprising:
    using speech recognition software to determine a first point where the first spoken word is in the voice message, the first point being the beginning point of the voice message segment; and
    using the speech recognition software to determine a second point where the second spoken word is in the voice message, the second point being the ending point of the voice message segment in the voice message.

6. The method of claim 1, further comprising: saving a segment begin index when the mark begin segment command is received;
    saving a segment end index when the mark end segment command is received, wherein the segment begin index and the segment end index are stored separately from the voice message; and
    determining the voice message segment using the segment begin index and the segment end index.

7. The method of claim 3, further comprising:
    sending a prompt to the telephonic device for the action command for the action to take for the voice message segment.

8. The method of claim 1, further comprising:
    receiving a second action to take for a second voice message formed from the voice message with the voice message segment deleted from the voice message; and
    performing the second action for the second voice message.

9. The method of claim 1, further comprising notifying a recipient of the voice message segment that an edited version of the voice message is being provided.

10. The method of claim 1, wherein the voice message comprises at least one of a voicemail message, an email message translated into voice, and an instant message translated into voice.

11. The method of claim 1, wherein the voice modality comprises at least one of a plain old telephone service (POTS), cellular, voice over internet protocol (VOIP), and instant messaging modality.

12. A method for manipulating a voice message using a telephone user interface (TUI) the method comprising:

receiving a mark segment set command indicating that a set of segments for a voice message is desired to be entered from a telephonic device through a voice modality;

receiving a first mark begin segment command and a first mark end segment command from the telephonic device through the voice modality using the TUI to form a first voice message segment, and a second mark begin segment command and a second mark end segment command from the telephonic device through the voice modality via the TUI to form a second voice message segment, the second mark begin segment command being a type of command that is different from a type of command of the first mark end segment command, the beginning point for the second voice message segment being different from the ending point of the first voice message segment such that the first voice message segment and the second voice message segment are segments with an intermittent section of the voice message positioned between the first voice message segment and the second voice message segment;

receiving a mark end segment set command through the voice modality indicating an end to the set of segments being entered;

receiving an action command from the telephonic device using the TUI; and performing an action based on the action command for the set of segments for the voice message, wherein the first mark begin segment command indicates a beginning point for the first voice message segment in the voice message and the first mark end segment command indicates an ending point for the first voice message segment in the voice message, and wherein the second mark begin segment command indicates a beginning point for the second voice message segment in the voice message and the second mark end segment command indicates an ending point for the second voice message segment in the voice message.

13. The method of claim 12, further comprising combining the set of segments to form a single voice message segment.

14. The method of claim 13, wherein the action is performed for one of the single voice message segments.

15. The method of claim 12, wherein the first mark begin segment command, the second mark begin segment command, the first mark end segment command, and the second mark end segment command, are received while the voice message is being rendered by the telephone user interface.

16. The method of claim 12, wherein one of the mark begin segment commands comprises at least one of a dual-tone multi-frequency (DTMF) command and a voice modality command and the mark end segment command corresponding to the mark begin segment command comprises at least one of a DTMF command and a voice modality command.

17. The method of claim 12, wherein the action comprises at least one of saving the voice message segments, replaying the voice message segments, deleting the voice message segments from the voice message, forwarding the voice message segments, sending the voice message segments, joining the voice message segments into a single message segment and performing an action on the joined message segment, and sending the first message segment to a first user while sending the second message segment to a second user.

18. The method of claim 12, further comprising utilizing the voice message having at least one of a voicemail message, an email message translated into voice, and an instant message translated into voice.

19. The method of claim 12, further comprising utilizing the voice modality having at least one of a plain old telephone service (POTS), cellular, voice over internet protocol (VOIP), and instant messaging modality.

20. An apparatus for manipulating a voice message, the apparatus comprising:
one or more processors; and
logic encoded in one or more tangible media for execution by the one or more processors, and when executed operable to:
render a voice message to a telephonic device;
receive a mark begin segment command from the telephonic device through a voice modality, the mark begin segment command indicating a beginning point for a voice message segment in the voice message;
storing a first time value corresponding to the beginning point based on receiving the mark begin segment command, wherein the first time value is stored separately from the voice message;
receive a mark end segment command from the telephonic device through the voice modality, the mark end segment command indicating an ending point for the voice message segment in the voice message;
store a second time value corresponding to the ending point of the voice message segment based on receiving the mark end segment command, wherein the second time value is stored separately from the voice message;
determine the voice message segment based on receiving the mark begin segment command and the mark end segment command, the voice message segment being a section of the voice message and having a duration defined by the beginning point indicated by the first time value and the ending point indicated by the second time value, the first time value and the second time value being determined based on receiving respectively the mark begin segment command and the mark end segment command, with the mark begin segment command being a type of command that is different from a type of command of the mark end segment command;
receive, in response to a prompt to the telephonic device for selecting an action from a menu of possible actions, an action command from the telephonic device; and
perform an action on the voice message segment based on the action command received from the telephonic device.

21. The apparatus of claim 20, wherein the mark begin segment command comprises at least one of a dual-tone multi-frequency (DTMF) command and a voice command, and the mark end segment command comprises at least one of a DTMF command and a voice command.

22. The apparatus of claim 20, wherein the logic when executed that is operable to perform the action comprises at least one of logic when executed that is operable to save the voice message segment, logic when executed that is operable to replay the voice message segment, logic when executed that is operable to forward the voice message segment, logic when executed that is operable to delete the voice message segment from the voice message, and logic when executed that is operable to send the voice message segment.

23. The apparatus of claim 20, wherein the apparatus is configured to receive the mark begin segment command and the mark end segment command while the voice message is being rendered by a telephone user interface accessed via the telephonic device.

24. The apparatus of claim 20, further comprising logic when executed that is operable to:
save a segment begin index when the mark segment begin command is received;

save a segment end index when the mark segment end command is received, wherein the segment begin index and the segment end index are stored separately from the voice message; and determine the voice message segment using the segment begin index and the segment end index.

25. The apparatus of claim 24, wherein the mark begin segment command comprises a first spoken word and the mark end segment command comprises a second spoken word, the logic when executed being further operable to:

use speech recognition software to determine a first point where the first spoken word is in the voice message, the first point being the beginning point of the voice message segment; and use the speech recognition software to determine a second point where the second spoken word is in the voice message, the second point being the ending point of the voice message segment in the voice message.

26. The apparatus of claim 20, wherein the logic when executed is further operable to send a prompt to the telephonic device for an action to take for the voice message segment.

27. The apparatus of claim 20, wherein the logic when executed is further operable to notify a recipient of the voice message segment that an edited version of the voice message is being provided.

28. The apparatus of claim 20, further comprising:

a receiver configured to receive a second action to take for a second voice message formed from the voice message with the voice message segment deleted from the voice message; and an action performer configured to perform the second action for the second voice message.

29. The apparatus of claim 20, wherein the voice message comprises at least one of a voicemail message, an email message translated into voice, and an instant message translated into voice.

30. The apparatus of claim 20, wherein the voice modality comprises at least one of a plain old telephone service (POTS), cellular, voice over internet protocol (VOIP), and instant messaging modality.

31. A system, comprising:
a telephonic device; and
a telephonic user interface (TUI) accessed using the telephonic device, the TUI compromising:
logic configured to receive a mark begin segment command from the telephonic device through a voice modality using the TUI, the mark begin segment command indicating a beginning point for a voice message segment in a voice message;
logic configured to store a first time value corresponding to the beginning point of the voice message segment based on receiving the mark begin segment command, the first time value being stored separately from the voice message;
logic configured to receive a mark end segment command from the telephonic device through the voice modality using the TUI, the mark segment command indicating an ending point for the voice message segment in the voice message;
logic configured to store a second time value corresponding to the ending point of the voice message segment based on receiving the mark end segment command, wherein the second time value is stored separately from the voice message;
logic configured to determine the voice message segment based on receiving the mark begin segment command and the mark end segment command, the voice message segment being a section of the voice message, the voice message segment having a duration being defined by the beginning point indicated by the first time value and the ending point indicated by the second time value, the first time value and the second time value being determined based on receiving respectively the mark begin segment command and the mark end segment command, with the mark begin segment command being a type of command that is different from a type of command of the mark end segment command;
logic configured to receive, in response to a prompt to the telephonic device for selecting an action from a menu of possible actions, an action command from the telephonic device using the TUI; and
logic configured to perform an action on the voice message segment based on the action command received from the telephonic device.

32. The system of claim 31, wherein the telephonic device comprises at least one of a plain old telephone service (POTS) telephone, cellular telephone, and a voice client on a computing device.

33. The system of claim 31, wherein the TUI is part of a unified messaging system or voice messaging system.

34. The system of claim 31, wherein the voice modality comprises at least one of a POTS, cellular, voice over internet protocol (VOIP), and instant messaging modality.

35. The method of claim 12, further comprising:
storing a plurality of time values corresponding to the beginning points and ending points based on receiving the first mark begin segment command and second mark begin segment command and the first mark end segment command and second mark end segment command, wherein the plurality of time values are stored separately from the voice message; and
determining the first voice message segment and the second voice message segment using the stored plurality of time values for the beginning points and the ending points.

36. The method for manipulating a voice message using a telephone user interface (TUI) of claim 12, wherein the first voice message segment is adjacent the second voice message segment.

37. The method of claim 36, wherein the first voice message segment and second voice message segment are segments without intermittent segments defined by commands positioned there between.

38. The method of claim 36, wherein the first voice message segment and second voice message segment are separated in time but not separated by other mark begin or mark end segments.

* * * * *

UNITED STATES PATENT AND TRADEMARK OFFICE
CERTIFICATE OF CORRECTION

| | | |
|---|---|---|
| PATENT NO. | : 8,000,456 B2 | Page 1 of 1 |
| APPLICATION NO. | : 11/408697 | |
| DATED | : August 16, 2011 | |
| INVENTOR(S) | : Khouri et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1099 days.

Signed and Sealed this
Fourteenth Day of February, 2012

David J. Kappos
*Director of the United States Patent and Trademark Office*